(12) United States Patent
Mahle et al.

(10) Patent No.: US 9,920,645 B2
(45) Date of Patent: Mar. 20, 2018

(54) SEALING SYSTEM FOR A TURBOMACHINE

(71) Applicant: MTU AERO ENGINES GMBH, Munich (DE)

(72) Inventors: Inga Mahle, Munich (DE); Alexander Boeck, Kottgeisering (DE)

(73) Assignee: MTU AERO ENGINES GMBH, Munich (DE)

(*) Notice: Subject to any disclaimer, the term of this patent is extended or adjusted under 35 U.S.C. 154(b) by 1145 days.

(21) Appl. No.: 13/856,243

(22) Filed: Apr. 3, 2013

(65) Prior Publication Data

US 2013/0266426 A1  Oct. 10, 2013

(30) Foreign Application Priority Data

Apr. 4, 2012  (EP) .................... 12163064

(51) Int. Cl.
| | |
|---|---|
| *F01D 11/08* | (2006.01) |
| *F01D 5/22* | (2006.01) |
| *F01D 11/12* | (2006.01) |
| *B33Y 80/00* | (2015.01) |

(52) U.S. Cl.
CPC ............. *F01D 11/08* (2013.01); *F01D 5/225* (2013.01); *F01D 11/122* (2013.01); *F01D 11/127* (2013.01); *B33Y 80/00* (2014.12); *F05D 2240/55* (2013.01); *Y02T 50/673* (2013.01)

(58) Field of Classification Search
CPC ...... F01D 11/08; F01D 11/122; F01D 11/127; F01D 5/225; F01D 11/12; F05D 2240/55; Y02T 50/673

USPC ............... 415/173.1, 173.4, 173.5, 174.2
See application file for complete search history.

(56) References Cited

U.S. PATENT DOCUMENTS

| | | | |
|---|---|---|---|
| 4,856,963 A | 8/1989 | Klapproth et al. | |
| 4,863,538 A | 9/1989 | Deckard | |
| 5,197,281 A * | 3/1993 | Przytulski | B64C 11/48 29/889.21 |
| 6,139,263 A * | 10/2000 | Klingels | F01D 5/225 415/173.5 |
| 6,223,524 B1 * | 5/2001 | Durcan | F01D 5/225 415/173.6 |
| 2003/0107181 A1 * | 6/2003 | Wieghardt | F01D 11/122 277/415 |
| 2006/0131815 A1 | 6/2006 | Meier | |
| 2009/0041610 A1 | 2/2009 | Meier | |

(Continued)

FOREIGN PATENT DOCUMENTS

| | | |
|---|---|---|
| DE | 19807247 A1 | 9/1999 |
| DE | 102009018685 A1 | 10/2010 |

(Continued)

*Primary Examiner* — Laert Dounis
*Assistant Examiner* — Kelsey Stanek
(74) *Attorney, Agent, or Firm* — Abel Law Group, LLP

(57) ABSTRACT

Disclosed is a sealing system for a turbomachine, in particular for a gas turbine, the sealing system being formed in an annular space between a flow-limiting wall of the turbomachine and at least one rotor blade tip of a rotor blade or an outer shroud arranged on the rotor blade tip, and comprising at least one sealing point. The sealing point comprises at least one run-in coating arranged on the rotor blade tip or on the outer shroud in the direction of the flow-limiting wall of the turbomachine. The invention furthermore encompasses a gas turbine comprising the sealing system.

20 Claims, 3 Drawing Sheets

(56) References Cited

U.S. PATENT DOCUMENTS

| | | | |
|---|---|---|---|
| 2009/0110548 A1* | 4/2009 | Durocher | F01D 11/001 415/173.4 |
| 2009/0142187 A1* | 6/2009 | Narita | F01D 11/001 415/173.1 |
| 2010/0117859 A1* | 5/2010 | Mitchell | F01D 17/02 340/870.16 |
| 2010/0143103 A1 | 6/2010 | Sellars et al. | |
| 2010/0259013 A1* | 10/2010 | Schreiber | F01D 11/122 277/415 |
| 2011/0014055 A1 | 1/2011 | Hertter et al. | |
| 2011/0020560 A1* | 1/2011 | Daeubler | C23C 4/06 427/446 |
| 2011/0070072 A1* | 3/2011 | Subramaniyan | F01D 5/225 415/173.2 |
| 2011/0106290 A1* | 5/2011 | Hovel | B22F 3/1055 700/120 |
| 2012/0034092 A1 | 2/2012 | Jakimov et al. | |
| 2012/0121431 A1* | 5/2012 | Jakimov | C23C 24/04 416/241 R |
| 2012/0230818 A1* | 9/2012 | Shepherd | F01D 5/20 415/208.1 |
| 2012/0251777 A1* | 10/2012 | Duval | B22F 1/02 428/144 |
| 2013/0045091 A1* | 2/2013 | Della-Fera | F01D 11/122 415/174.4 |

FOREIGN PATENT DOCUMENTS

| | | | | |
|---|---|---|---|---|
| DE | 102009036407 A1 * | 2/2011 | | C23C 24/04 |
| WO | 2004061340 A1 | 7/2004 | | |

\* cited by examiner

SEALING SYSTEM FOR A TURBOMACHINE

CROSS-REFERENCE TO RELATED APPLICATIONS

The present application claims priority under 35 U.S.C. § 119 of European Patent Application No. 12163064.4, filed Apr. 4, 2012, the entire disclosure of which is expressly incorporated by reference herein.

BACKGROUND OF THE INVENTION

1. Field of the Invention

The invention relates to a sealing system for a turbomachine, in particular for a gas turbine, the sealing system being formed in an annular space between a flow-limiting wall of the turbomachine and at least one rotor blade tip of a rotor blade or an outer shroud arranged on the rotor blade tip, and comprising at least one sealing point. The invention furthermore relates to a gas turbine, in particular to an aircraft engine, comprising at least one sealing system.

2. Discussion of Background Information

Sealing systems of this type are used in particular in what are referred to as gap retention systems in compressor and turbine components. In this case, sealing systems of this type have the task of keeping a sealing gap between a rotating blade arrangement and a housing and also the gaps between a stationary blade arrangement and the rotating rotor hubs to a minimum and therefore of guaranteeing a stable operating behavior with a high degree of efficiency. Customarily, the rotating components of the turbine have sealing fins or sealing tips which, as is known, graze against or run in against honeycomb-shaped seals. The seals here are in the form of stripping and run-in coatings. Corresponding sealing systems are known, for example, from U.S. Pat. No. 4,856,963 and DE 198 07 247 A1, the entire disclosures of which are incorporated by reference herein. Complex stripping and run-in structures are usually placed into the static regions of the compressor components and turbine components. However, from an aerodynamic aspect, this design may have considerable disadvantages resulting in a significant deterioration in the efficiency of the turbomachine.

SUMMARY OF THE INVENTION

It is an object of the present invention to provide a sealing system of the type mentioned at the beginning, which ensures an aerodynamically more advantageous arrangement and refinement of the sealing system and therefore an increase in the efficiency of a turbomachine. It is a further object of the invention to provide a corresponding gas turbine with improved efficiency.

The present invention provides a sealing system for a turbomachine, wherein the sealing system is formed in an annular space between a flow-limiting wall of the turbomachine and at least one rotor blade tip of a rotor blade or an outer shroud arranged on the rotor blade tip, and comprises at least one sealing point. The sealing point comprises at least one run-in coating arranged on the rotor blade tip or on the outer shroud in the direction of the flow-limiting wall of the turbomachine.

In one aspect of the sealing system, the at least one sealing point may comprise at least one sealing tip which is opposite the run-in coating and is arranged on an inner side of the wall.

In another aspect, the sealing system may comprise at least two sealing points, and in particular, at least two sealing points per rotor blade. In each case the sealing points consist of one run-in coating arranged on the rotor blade tip or on the outer shroud and of at least one sealing tip which is opposite a particular run-in coating and is arranged on the inner side of the wall. The run-in coatings are arranged one behind another in the flow direction.

In yet another aspect, the sealing system may have at least two sealing points, a first sealing point comprising a sealing tip arranged on the rotor blade tip or on the outer shroud, the sealing tip being arranged opposite a run-in coating arranged on an inner side of the flow-limiting wall, and a second sealing point comprising a run-in coating arranged on the rotor blade tip or on the outer shroud and also the sealing tip arranged on the inner side of the wall and opposite the run-in coating.

In a still further aspect of the sealing system, the rotor blade may be a part of a series of rotor blades comprising a plurality of rotor blades.

In another aspect, the at least one run-in coating may be fastened to the rotor blade tip or to the outer shroud of the rotor blade by at least one of mechanical fastening elements, by soldering or by welding or laser welding.

In another aspect, the at least one run-in coating may be formed in one piece with the rotor blade tip of the rotor blade or in one piece with an outer shroud arranged on the rotor blade tip.

In another aspect, the at least one run-in coating may be produced in one piece with the rotor blade in one production step, or the at least one run-in coating may be formed with the rotor blade tip of the rotor blade or with an outer shroud arranged on the rotor blade tip.

In another aspect of the sealing system, the at least one run-in coating may be applied directly on the rotor blade tip or the outer shroud of the rotor blade by a generative production process and/or a thermal spraying process.

In another aspect, the at least one run-in coating may be applied in one piece with the rotor blade tip or the outer shroud of the rotor blade and/or the sealing tip may be formed in one piece with the flow-limiting wall.

In yet another aspect, the sealing system of the present invention may be in the form of a stepped labyrinth.

The present invention also provides a gas turbine such as, for example, an aircraft engine, that comprises at least one sealing system according to the present invention as set forth above (including the various aspects thereof).

A sealing system according to the invention for a turbomachine, in particular for a gas turbine, is formed in an annular space between a flow-limiting wall of the turbomachine and at least one rotor blade tip of a rotor blade or an outer shroud arranged on the rotor blade tip. In this case, the sealing system comprises at least one sealing point, the sealing point having at least one run-in coating arranged on the rotor blade tip or on the outer shroud in the direction of the flow-limiting wall of the turbomachine. The flow-limiting wall can be a housing of the turbomachine. Furthermore, it is possible for the sealing system to comprise at least one sealing tip which is opposite the run-in coating and is arranged on an inner side of the wall. By means of the sealing system according to the invention, it is possible to optimize the aerodynamics of the turbomachine in the region of the sealing point, in particular since, according to the invention, the at least one run-in coating rotates with the rotor blade, and the at least one sealing tip or housing wall is opposite the rotating run-in coating and therefore operatively connected thereto, the sealing tip being fixed statically on the housing part of the turbomachine, in particular on the inner side of a flow-limiting wall, and the housing wall being, for example, an inner wall of a compressor housing. Owing to the abovementioned aerodynamic optimization, an increase in the efficiency of a turbomachine is produced. In this case, the rotor blade may be part of a series of rotor blades comprising a plurality of rotor blades.

In further advantageous refinements of the sealing system according to the invention, the latter comprises at least two sealing points, the sealing points consisting of in each case one run-in coating arranged on the rotor blade tip or on the outer shroud and of in each case at least one sealing tip which is opposite the particular run-in coating and is arranged on the inner side of the wall. In this case, the run-in coatings are arranged one behind another in the flow direction. However, it is also possible for the sealing system in turn to have at least two sealing points, the first sealing point comprising a sealing tip arranged on the rotor blade tip or on the outer shroud, said sealing tip being arranged opposite a run-in coating arranged on an inner side of the flow-limiting wall, and the second sealing point comprising the run-in coating arranged on the rotor blade tip or on the outer shroud and also the sealing tip arranged on the inner side of the wall and opposite the run-in coating. The sealing system according to the invention can advantageously be matched to the particular requirements imposed on the turbomachine in order, ultimately, to obtain an increase in the efficiency.

In further advantageous refinements of the sealing system according to the invention, the sealing tips can be formed in one piece with the shroud and/or the flow-limiting wall. The sealing tips can furthermore be formed in one piece on the blade tip. The formation in one piece can afford advantages in terms of manufacturing, permitting a overall reduction in costs for the production of the sealing system.

In some embodiments according to the invention, "in one piece" refers to "a piece" which, as a component or as a unit, is not separable or is separable only destructively or is severable only destructively. "Formation in one piece" is the noun associated with "in one piece".

"Formation in one piece" can be produced by means of a single production step or manufacturing step. For example, a cast part is generally produced or cast in one piece in one manufacturing step. Further machining steps, such as, for example, surface machining or hardening, are possible.

In a number of embodiments according to the invention, "formation in one piece" can be produced or generated by means of an additional machining step of an already existing component. For example, a component can be changed by means of welding. After this machining step, the component is in one piece, since the component is not separable or is separable only destructively.

In some embodiments according to the invention, "formation in one piece" can be produced in terms of manufacturing by means of in particular generative processes (or production processes) based on a powder bed. Examples of production processes of this type are: selective laser melting (abbreviated to SLM), selective laser sintering, laser engineered net shaping (LENS), electron beam based powder bed processes, electron beam assisted powder bed processes (Electron Beam Melting, abbreviated to EBM) or wire and nozzle processes.

In a number of refinements of the sealing system according to the invention, a run-in coating or a plurality of run-in coatings can be formed in one piece with the rotor blade tip of the rotor blade and/or with an outer shroud arranged on the rotor blade tip. This makes it possible to afford advantages in terms of manufacturing, which can furthermore permit a reduction in costs for the production of the sealing system.

In further advantageous refinements of the sealing system according to the invention, the at least one run-in coating can be fastened to the rotor blade tip or to the outer shroud of the rotor blade by means of mechanical fastening means, by means of soldering or by means of welding or laser welding.

In some advantageous refinements of the sealing system according to the invention, the at least one run-in coating can be applied, in particular (in one piece or not in one piece), directly on the rotor blade tip or the outer shroud of the rotor blade by means of a generative production process, such as, for example, selective laser melting or selective laser sintering and/or by means of a thermal spraying process, such as, for example, flame spraying, high velocity flame spraying, plasma spraying or kinetic cold gas compaction (K3). The production processes and fastening processes used can advantageously in turn be matched to the particular requirements imposed on the turbomachine.

In a further advantageous refinement of the sealing system according to the invention, the sealing system is in the form of a stepped labyrinth. As a result, the sealing system can advantageously be matched to the corresponding circumstances of the turbomachine, in particular to the existing circumstances in a low pressure gas turbine.

The invention furthermore relates to a gas turbine, in particular to an aircraft engine, comprising at least one sealing system, the sealing system being arranged in an annular space between a flow-limiting wall of the gas turbine and at least one rotor blade tip of a rotor blade or an outer shroud arranged on the rotor blade tip. In this case, the sealing system comprises at least one sealing point, the sealing point having at least one run-in coating arranged on the rotor blade tip or on the outer shroud in the direction of the flow-limiting wall of the turbomachine. Furthermore, it is possible for the sealing system to comprise at least one sealing tip which is opposite the run-in coating and is arranged on an inner side of the wall. By means of the sealing system according to the invention, it is possible to optimize the aerodynamics of the turbomachine in the region of the sealing point, in particular since, according to the invention, the at least one run-in coating rotates with the rotor blade, and the at least one sealing tip or housing wall is opposite the rotating run-in coating and is therefore operatively connected thereto, the sealing tip being fixed statically to the housing part of the turbomachine, in particular to the inner side of a flow-limiting wall, and the housing wall being, for example, an inner wall of a compressor housing. The flow-limiting wall can also be a turbine housing. By means of the abovementioned improved aerodynamics, the gas turbine according to the invention has improved efficiency.

Further refinements of the sealing system of the gas turbine according to the invention have been described in the foregoing.

Further features of the invention emerge from the claims, the exemplary embodiments and with reference to the drawings. The features and combinations of features mentioned above in the description and the features and combinations of features mentioned below in the exemplary embodiments are useable not only in the respectively stated combination, but also in different combinations without departing from the scope of the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
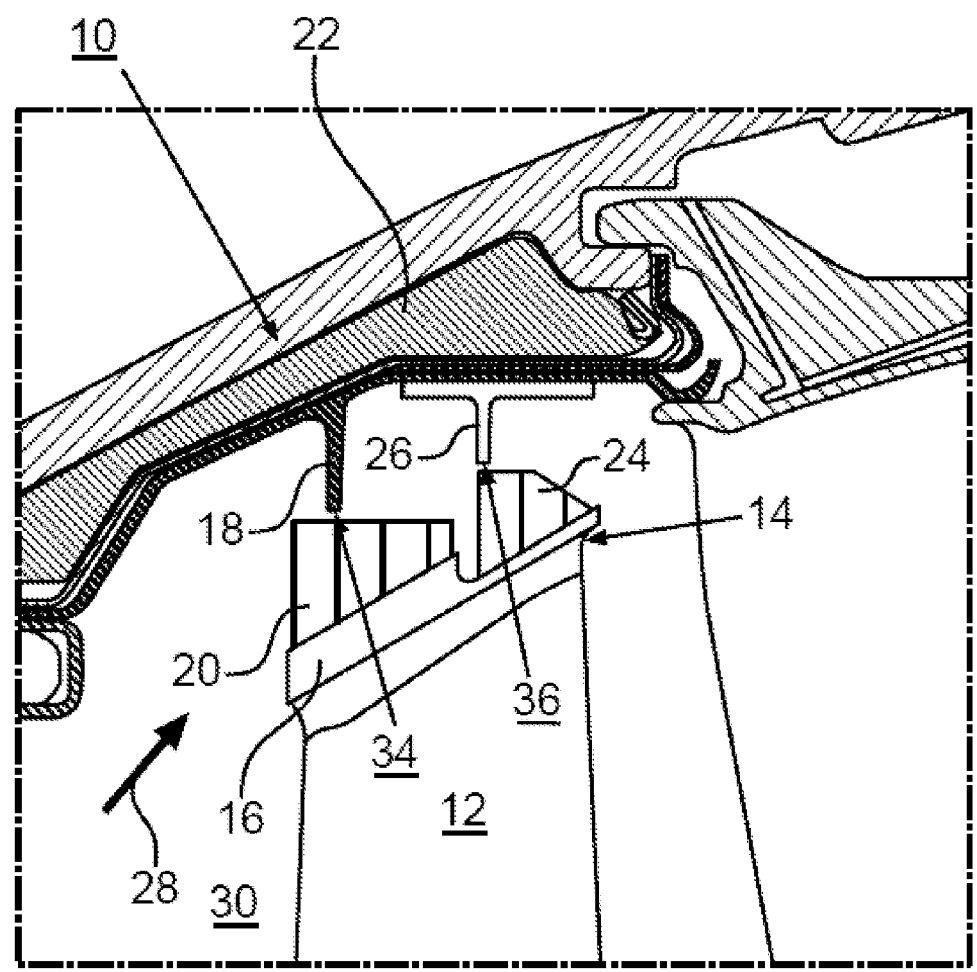
FIG. 1 shows a schematic and partially sectioned partial view of a first embodiment of a sealing system according to the invention.

The sealing system 10 illustrated in FIG. 1 is part of a low pressure gas turbine. It is seen that the sealing system 10 is arranged in annular space 30 between a flow-limiting wall 22 of the low pressure gas turbine and a series of rotor blades comprising a plurality of rotor blades 12 or an outer shroud 16 arranged on a rotor blade tip 14. In this case, the sealing system 10 comprises two sealing points 34, 36, the second sealing point 36 being arranged behind the first sealing point 34 in the flow direction 28. In this case, the sealing points 34, 36 consist of in each case one run-in coating 20, 24 arranged on the outer shroud 16 and in each case one sealing tip 18, 26 which is opposite the particular run-in coating 20, 24 and is arranged on the inner side of the wall 22. In addition, the run-in coatings 20, 24 are arranged one behind the other in the flow direction 28. The run-in coatings 20, 24 can be formed in the customary manner. In the exemplary embodiment illustrated, they have a honeycomb structure. The run-in coatings 20, 24 can be fastened to the outer shroud 16 of the rotor blade 12 by means of mechanical fastening means, by means of soldering or by means of welding or laser welding. However, it is also possible for the run-in coatings 20, 24 to be applied directly on the rotor blade tip 14 or on the outer shroud 16 of the rotor blade 12 by means of a generative production process and/or by means of a thermal spraying process. In particular, powder spray casting processes can be used in this case. However, it is also possible to provide the run-in coatings 20, 24 as a complete system with the regions mentioned. In the exemplary embodiment illustrated, the run-in coatings 20, 24 are applied onto the outer shroud 16 by means of a kinetic cold gas compacting process (K3). The run-in coatings 20, 24 and the sealing tips 18, 26 of the sealing system 10 can consist of customarily used materials. A multiplicity of materials is known for this purpose.

Furthermore, it is seen that the sealing system 10 illustrated is in the form of a stepped labyrinth.

Figure 2:
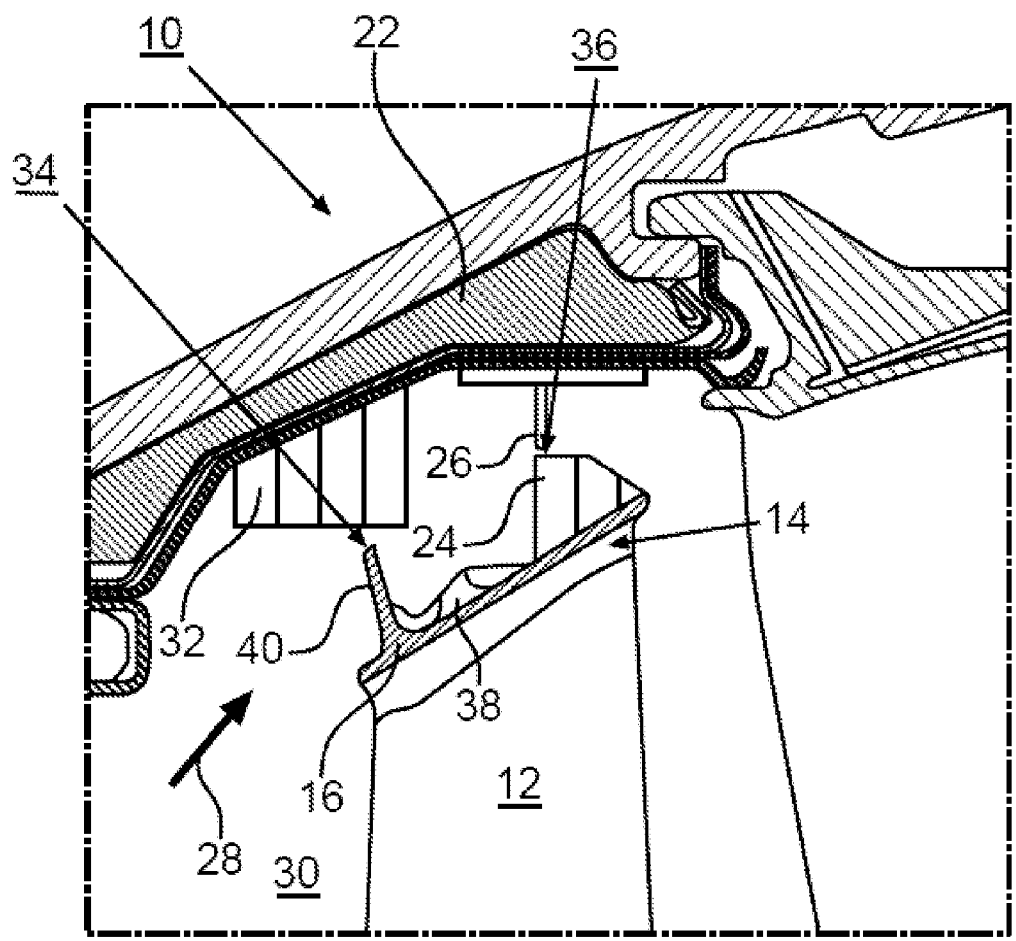
FIG. 2 shows a schematic and partially sectioned partial view of a second embodiment of a sealing system according to the invention.

FIG. 2 shows a schematic and partially sectioned partial view of a second embodiment of a sealing system 10. It is seen that the sealing system 10 is in turn arranged in the annular space 30 between the flow-limiting wall 22 of a low pressure gas turbine and a series of rotor blades comprising a plurality of rotor blades 12 and the outer shroud 16 arranged on the rotor blade tip 14. The sealing system 10 also comprises two sealing points 34, 36 in this exemplary embodiment, the second sealing point 36 being arranged behind the first sealing point 34 in the flow direction 28. In contrast to the first embodiment of the sealing system that is illustrated in FIG. 1, the first sealing point 34 comprises a sealing tip 40 arranged on the outer shroud 16, the sealing tip 40 being arranged opposite a run-in coating 32 arranged on an inner side of the flow-limiting wall 22. The second sealing point 36 has the run-in coating 24 arranged on the outer shroud 16 and also the sealing tip 26 arranged on the inner side of the wall 22 and opposite the run-in coating 24. In the exemplary embodiment illustrated, the run-in coating 24 is in each case arranged on the outer shroud 16 behind the sealing tip 40 in the flow direction 28. However, it is also possible for the run-in coating 24 to be arranged in front of the sealing tip 40 in the flow direction 28. The corresponding sealing tip 26 formed on the inner side of the wall 22 and the run-in coating 32 are then likewise arranged in a reverse sequence in comparison to the exemplary embodiment illustrated in FIG. 2.

Furthermore, it is seen that the run-in coating 24 is arranged in the flow direction 28 axially behind a stiffening rib 38 produced by a Z latching of the shrouds 16. The sealing system 10 illustrated in FIG. 2 is also in the form of a stepped labyrinth.

Figure 3:
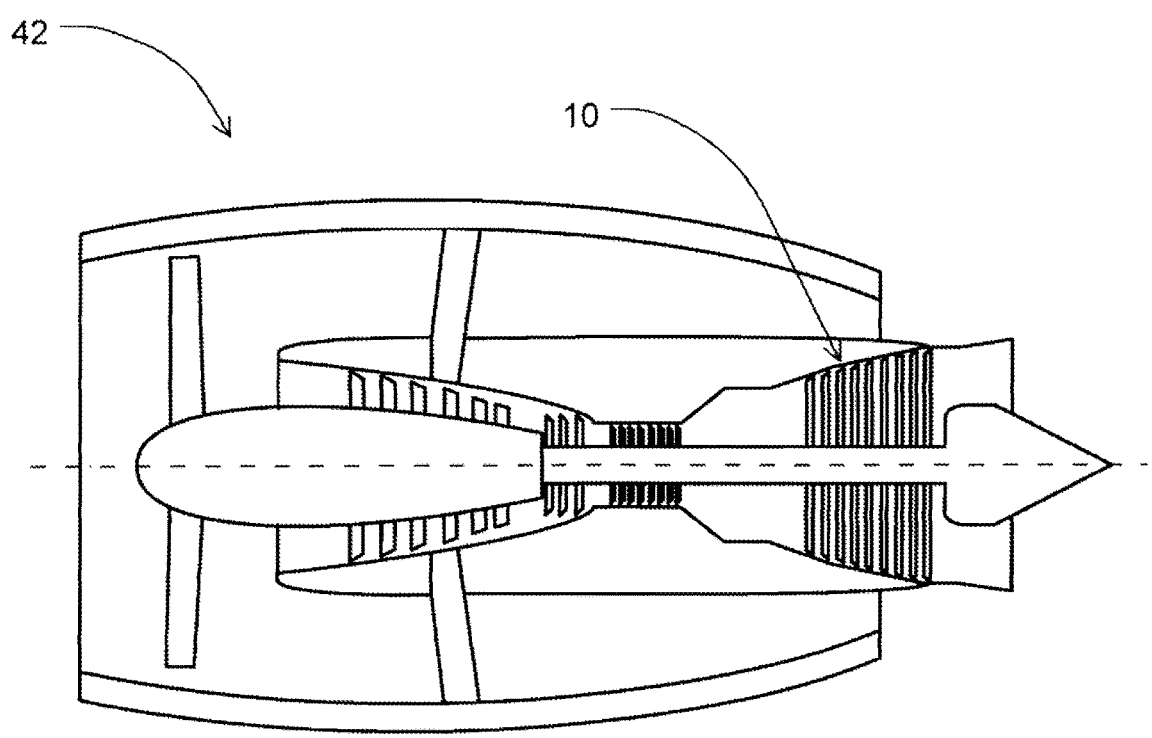
FIG. 3 shows a longitudinal section of a gas turbine according to the invention with a first or second embodiment of a sealing system according to the invention.

FIG. 3 shows a longitudinal section of a gas turbine 42 according to the invention with a first or second embodiment of a sealing system 10 according to the invention. The gas turbine 42 according to the invention is designed as a low pressure gas turbine or aircraft engine.

The sealing systems illustrated in the exemplary embodiments are not restricted to the low pressure gas turbine region. They may also be used in, for example, the compressor of the gas turbine. In particular, in this case, the run-in coating is arranged on the rotor blade tip of a rotor blade of the compressor.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire disclosure of the co-pending application entitled "PROCESS FOR PRODUCING A RUN-IN COATING" Ser. No. 13/856,235, filed on even date herewith, is incorporated by reference herein.

What is claimed is:

1. A sealing system for a turbomachine, wherein the sealing system is formed in an annular space between a flow-limiting wall of the turbomachine and at least one rotor blade tip of a rotor blade or an outer shroud arranged on the rotor blade tip, the sealing system comprising at least two sealing points per rotor blade, which sealing points comprise
   (i) a first sealing point with a first run-in coating arranged on the rotor blade tip or on the outer shroud in a direction of the flow-limiting wall of the turbomachine and a first sealing tip arranged on an inner side of the wall opposite the first run-in coating, and (ii) a second sealing point with either
    (a) a second run-in coating arranged on the rotor blade tip or on the outer shroud in a direction of the flow-limiting wall of the turbomachine and a second sealing tip arranged on an inner side of the wall opposite the second run-in coating, the first and second run-in coatings arranged one behind the other in flow direction, or
    (b) a second sealing tip arranged on the rotor blade tip or on the outer shroud in a direction of the flow-limiting wall of the turbomachine and a second run-in coating arranged on an inner side of the wall opposite the second sealing tip.

2. The sealing system of claim 1, wherein the second sealing point is according to (a).

3. A gas turbine, wherein the gas turbine comprises the sealing system of claim 2.

4. The gas turbine of claim 3, wherein the gas turbine is an aircraft engine.

5. The sealing system of claim 1, wherein the second sealing point is according to (b).

6. A gas turbine, wherein the gas turbine comprises the sealing system of claim 5.

7. The gas turbine of claim 6, wherein the gas turbine is an aircraft engine.

8. The sealing system of claim 1, wherein at least one of the first and second run-in coatings is fastened to the rotor blade tip or to the outer shroud of the rotor blade by mechanical fastening elements.

9. The sealing system of claim 1, wherein at least one of the first and second run-in coatings is fastened to the rotor blade tip or to the outer shroud of the rotor blade by at least one of soldering, or welding or laser welding.

10. The sealing system of claim 1, wherein at least one of the first and second run-in coatings is formed in one piece with the rotor blade tip of the rotor blade.

11. The sealing system of claim 1, wherein at least one of the first and second run-in coatings is formed in one piece with an outer shroud arranged on the rotor blade tip.

12. The sealing system of claim 1, wherein at least one of the first and second run-in coatings is produced in one piece with the rotor blade in one production step.

13. The sealing system of claim 1, wherein at least one of the first and second run-in coatings is applied directly on the rotor blade tip or the outer shroud of the rotor blade by a generative production process.

14. The sealing system of claim 13, wherein the generative production process comprises selective laser melting.

15. The sealing system of claim 13, wherein the generative production process comprises selective laser sintering.

16. A gas turbine, wherein the gas turbine comprises the sealing system of claim 13.

17. The gas turbine of claim 16, wherein the gas turbine is an aircraft engine.

18. The sealing system of claim 1, wherein at least one of the first and second run-in coatings is applied directly on the rotor blade tip or the outer shroud of the rotor blade by a thermal spraying process.

19. The sealing system of claim 1, wherein at least one of the first and second sealing tips is formed in one piece with the flow-limiting wall.

20. The sealing system of claim 1, wherein the sealing system is in the form of a stepped labyrinth.

* * * * *